(12) United States Patent
Brown

(10) Patent No.: US 12,696,970 B2
(45) Date of Patent: Aug. 4, 2026

(54) HAMMOCK MOUNTING BRACKET

(71) Applicant: Randall Lee Brown, Lorena, TX (US)

(72) Inventor: Randall Lee Brown, Lorena, TX (US)

( * ) Notice: Subject to any disclaimer, the term of this patent is extended or adjusted under 35 U.S.C. 154(b) by 0 days.

(21) Appl. No.: 18/600,651

(22) Filed: Mar. 9, 2024

(65) Prior Publication Data

US 2025/0359647 A1 Nov. 27, 2025

(51) Int. Cl.
| | |
|---|---|
| *A45F 3/24* | (2006.01) |
| *A45F 3/22* | (2006.01) |
| *A47C 17/80* | (2006.01) |
| *A47C 17/84* | (2006.01) |
| *B60R 11/00* | (2006.01) |
| *B62D 33/06* | (2006.01) |

(52) U.S. Cl.
CPC ................. *A45F 3/24* (2013.01); *A45F 3/22* (2013.01); *A47C 17/80* (2013.01); *A47C 17/84* (2013.01); *B60R 11/00* (2013.01); *B62D 33/0612* (2013.01); *B60R 2011/0022* (2013.01); *B60R 2011/0052* (2013.01); *B62D 33/06* (2013.01)

(58) Field of Classification Search
CPC ... A45F 3/24; A45F 3/22; A47C 17/80; A47C 17/84; B60R 11/00; B60R 2011/0001; B60R 2011/0003; B62D 33/06; B62D 33/0612
USPC ............ 5/127, 120, 118; 296/190.01, 190.02
See application file for complete search history.

(56) References Cited

U.S. PATENT DOCUMENTS

| | | | | |
|---|---|---|---|---|
| 3,454,968 | A * | 7/1969 | Beckman ............... | A47D 9/016 5/118 |
| 4,221,424 | A * | 9/1980 | Eiserman ........... | B62D 33/0612 5/120 |
| 5,170,521 | A * | 12/1992 | Light ..................... | A47C 17/84 5/118 |
| 7,073,216 | B2 * | 7/2006 | Schwingeler .......... | A47C 17/80 5/118 |
| 8,117,691 | B2 * | 2/2012 | Bishop ...................... | A45F 3/22 5/118 |
| 8,366,165 | B2 * | 2/2013 | Maximilien ........... | A47C 17/80 5/118 |
| 11,491,900 | B2 * | 11/2022 | Katoh ........................ | A45F 3/24 |
| 11,760,272 | B2 * | 9/2023 | Stahl ........................ | B60P 3/38 5/110 |
| 2005/0022304 | A1 * | 2/2005 | Schwingeler ............ | A61G 1/00 5/118 |
| 2009/0134648 | A1 * | 5/2009 | Maximilien ........... | B60N 3/008 5/118 |
| 2009/0205131 | A1 * | 8/2009 | Bishop ...................... | A45F 3/24 5/118 |
| 2020/0391635 | A1 * | 12/2020 | Katoh ........................ | A45F 3/24 |
| 2021/0162929 | A1 * | 6/2021 | Stahl ...................... | B60N 3/008 |
| 2025/0359647 | A1 * | 11/2025 | Brown ................... | B60R 11/00 |

* cited by examiner

*Primary Examiner* — Robert G Santos
(74) *Attorney, Agent, or Firm* — The Buche Law Firm, P.C.; Bryce A. Johnson; John K. Buche

(57) ABSTRACT

Hammock mounting brackets are disclosed herein that may be used to mount different styles of hammocks inside the cabin of a vehicle. Once fastened to the frame of the vehicle will remain in place ready to be used to suspend gathered end style hammocks and bridge style hammocks within the cabin of a vehicle.

5 Claims, 2 Drawing Sheets

HAMMOCK MOUNTING BRACKET

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not Applicable

STATEMENT REGARDING PRIOR DISCLOSURES BY THE INVENTOR OR A JOINT INVENTOR

Not Applicable

BACKGROUND OF THE INVENTION

Traditionally, hammocks used for leisure activities, including sleeping are anchored between two supporting structures such as trees or posts. Portable hammock stands that suspend a hammock above the ground can be free-standing or attached to the trailer hitch of a vehicle can be used when trees or posts are not accessible. These portable hammock stands can be heavy, bulky, and are cumbersome to maneuver and assemble. These portable hammock stands expose the user to the elements.

Hammock mounting brackets have been developed, manufactured, and sold commercially that use the internal frame of a vehicle as attachment points for the hammock mounting bracket. Sold under the tradename Meraki Hammocks, these brackets suspend the hammock inside the cabin of the vehicle.

FIELD OF THE INVENTION

This application generally relates to a hammock mounting bracket, and particularly a vehicle hammock mounting bracket for suspending a hammock inside the cabin of a vehicle.

DESCRIPTION OF RELATED ART INCLUDING INFORMATION DISCLOSED UNDER 37 CFR 1.97 AND 1.98

Not Applicable

BRIEF SUMMARY OF THE INVENTION

Hammock mounting brackets are disclosed herein that may be used to mount different styles of hammocks inside the cabin of a vehicle. These hammock mounting brackets are lightweight and once fastened to the frame of the vehicle will remain in place ready to be used to suspend hammocks within the cabin of the vehicle.

The hammock mounting brackets consist of apertures in which bolts are used to fasten the hammock mounting bracket to the frame where nut inserts are present. Where nut inserts are not present, the user may use blind nuts to secure the bolts through the hammock mounting bracket and to the frame.

The hammock mounting brackets allow for various hammock mounting solutions. The typical gathered end hammock makes use of carabiners at each end. When hammock mounting brackets are mounted diagonally on opposite sides of a vehicle, and each end of a hammock can be attached to an aperture in the hammock mounting brackets using carabiners.

Another method of gathering the end of hammocks is with a loop of cordage or webbing. Each bracket contains a U-shaped cut-out that creates a tab in which a loop of cordage or webbing can be secured. The user would insert one end of the loop of cordage or webbing into the aperture otherwise used for carabiners, and then around the tab created by the U-shaped cut-out. When pulled taught, the hammock is secured onto the hammock mounting bracket. This can be repeated that the other end of the hammock with a second hammock mounting bracket.

Another style of hammock that can be suspended inside of a vehicle using the hammock mounting brackets is a bridge style hammock. Bridge style hammocks are not gathered at the ends, but rather spread apart. By using a tension strap that is threaded through the slot of the hammock mounting brackets and then secured using a cam buckle, the webbed strap can be pulled taught. By securing tension straps at both ends of the cabin, two hammocks can be suspended side by side within the cabin of a vehicle.

BRIEF DESCRIPTION OF THE SEVERAL VIEWS OF THE DRAWING(S)

DETAILED DESCRIPTION OF THE INVENTION

Figures 1, 1A:
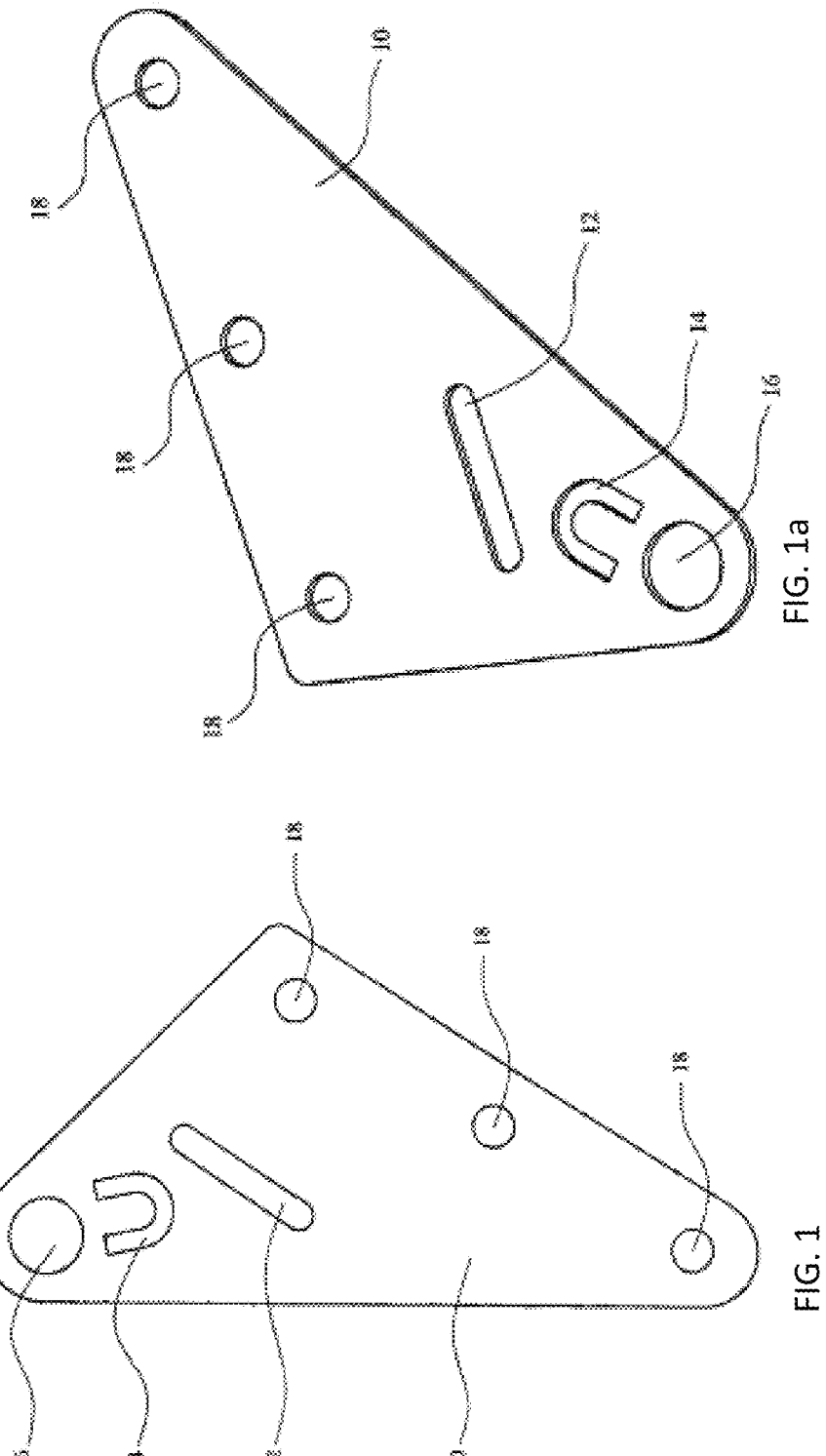
FIG. 1 is a plan view of a hammock mounting bracket for suspending a hammock inside of a vehicle.
FIG. 1a is a left side perspective view thereof.

Referring to FIG. 1, a plan view of a hammock mounting bracket 10 is shown. The hammock mounting bracket 10 includes three apertures 18 on the right side that are configured to fasten the hammock mounting bracket 10 to the interior frame of a vehicle.

Referring to FIG. 1a, the hammock mounting bracket 10 shows an aperture 16 that is used to receive a carabiner.

Figures 1B, 1C:
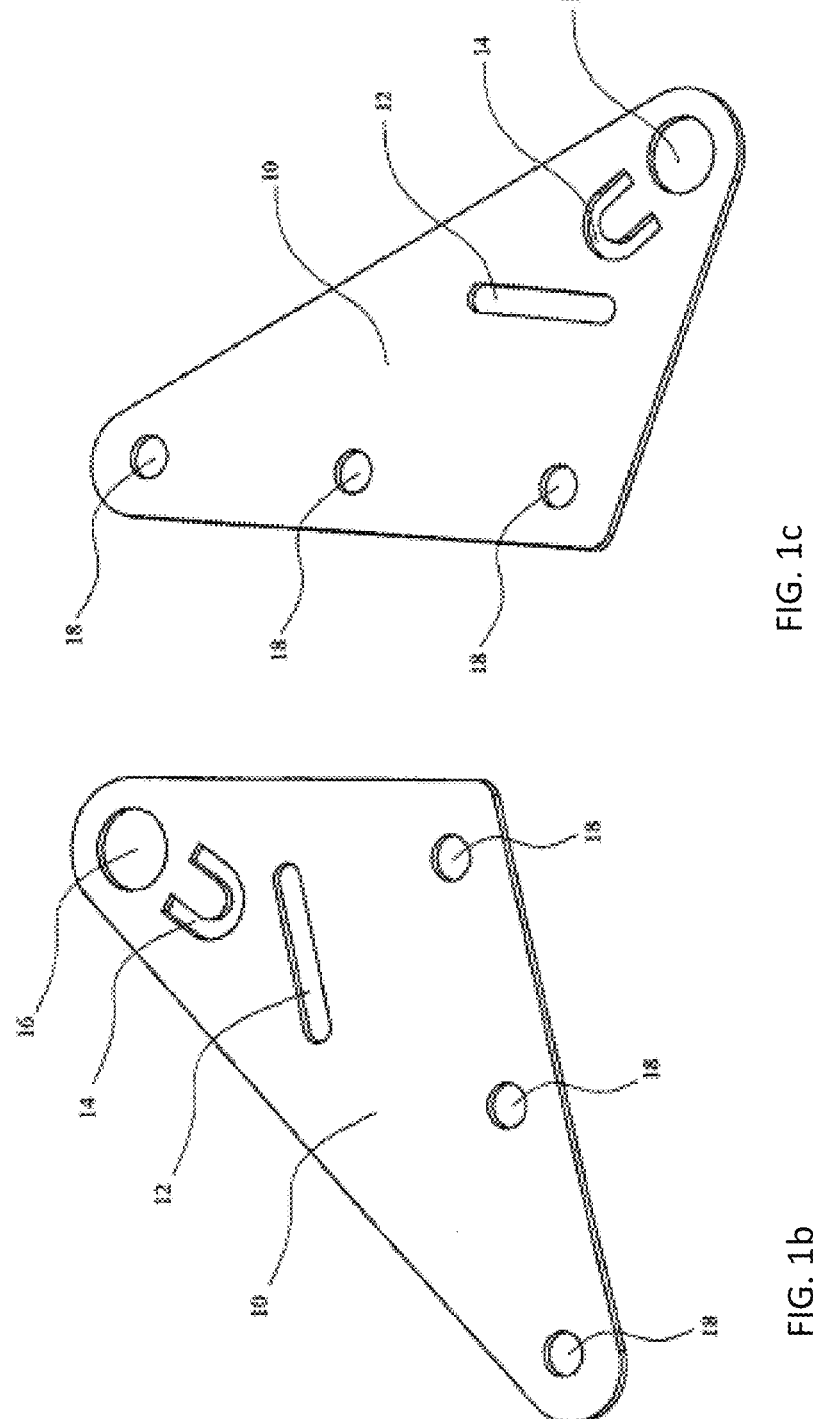
FIG. 1b is a right side perspective view thereof.
FIG. 1c is a top side perspective view.

Referring to FIG. 1b, the hammock mounting bracket 10 shows a tab 14 that is used to accept cordage or webbing that would be inserted through the aperture 16 and then looped over the tab 14. Referring to FIG. 1c, the hammock mounting bracket 10 shows a slot 12 that is used to accept webbing.

The invention claimed is:

1. A hammock mounting bracket (10) that is defined by a substantially flat, three-sided plate, said plate comprising:

at least one aperture (18) for fastening the hammock mounting bracket (10) to the interior frame of a vehicle, said aperture (18) located along one of the three sides of the flat, three-sided plate;

another aperture (16) for receiving a carabiner or cordage of a hammock, said aperture (16) located within a vertex of the other two sides of the flat, three-sided plate;

a tab (14) defined by a U-shaped cut out for receiving the cordage of the hammock, said tab (14) being located adjacent to the aperture (16) that is located within the vertex;

wherein the flat, three-sided plate is configured to be mounted onto any of (a) either a pillar on the driver side of the vehicle or a pillar on a passenger side of the vehicle, (b) the frame above either a driver side window or above a passenger side window.

2. The hammock mounting bracket of claim 1, wherein the hammock mounting bracket is fastened to the frame such that the hammock mounting bracket is above the driver side window or the frame above the passenger side window using a bolt through the at least one aperture (18), washer and nuts.

3. The hammock mounting bracket of claim 1, wherein the hammock mounting bracket is fastened to the pillar on either the driver side or to the pillar on the passenger side using bolts through the at least one aperture (18).

4. A system of a pair of hammock mounting brackets where each hammock mounting bracket is defined by a flat, triangular plate with three sides and comprises:

at least one aperture (18) for fastening the hammock mounting bracket (10) to the interior frame of a vehicle, said aperture (18) located along one of the three sides of the flat, triangular plate;

another aperture (16) for receiving a carabiner or cordage of a hammock, said aperture (16) located within a vertex of the other two sides of the flat, triangular plate;

a tab (14) defined by a U-shaped cut out for receiving the cordage of the hammock, said tab (14) being located adjacent to the aperture (16) that is located within the vertex;

a slot (12) that is at least partially incenter of the flat, triangular plate; and, when one mounting bracket is fastened to either a pillar on the driver side of the vehicle or a pillar on a passenger side of the vehicle, and the other one mounting bracket is fastened to the frame above either a driver side window or above a passenger side window, such that a hammock can be attached diagonally across the inside of the vehicle's cabin from either the pillar on the passenger side to above the driver side window or the pillar on the driver side to above the passenger side window using a carabiner through the other aperture (16), cordage secured to the tab (14), or webbing secured to the slot (12).

5. A system of two pairs of hammock mounting brackets where each hammock mounting bracket comprises:

at least one aperture (18) for fastening the hammock mounting bracket (10) to the interior frame of a vehicle;

another aperture (16) for receiving a carabiner or cordage of a hammock;

a tab (14) defined by a U-shaped cut out for receiving the cordage of the hammock, said tab (14) being located adjacent to the other aperture (16);

a slot (12) that is at located adjacent a center section of the mounting bracket; and, when one of the two pairs of mounting brackets is fastened to a pillar on the driver side of the vehicle and a pillar on a passenger side of the vehicle, and the other of the two pairs of mounting brackets is fastened to the frame above the driver side window and above the passenger side window, two bridge style hammocks can be suspended side by side within the vehicle using a tension strap at each end of the hammocks and secured through the slots (12) in the hammock mounting brackets.

* * * * *